Nov. 12, 1940.  J. J. STRANG  2,221,530
REFRIGERATING SYSTEM
Filed July 6, 1937  2 Sheets-Sheet 1
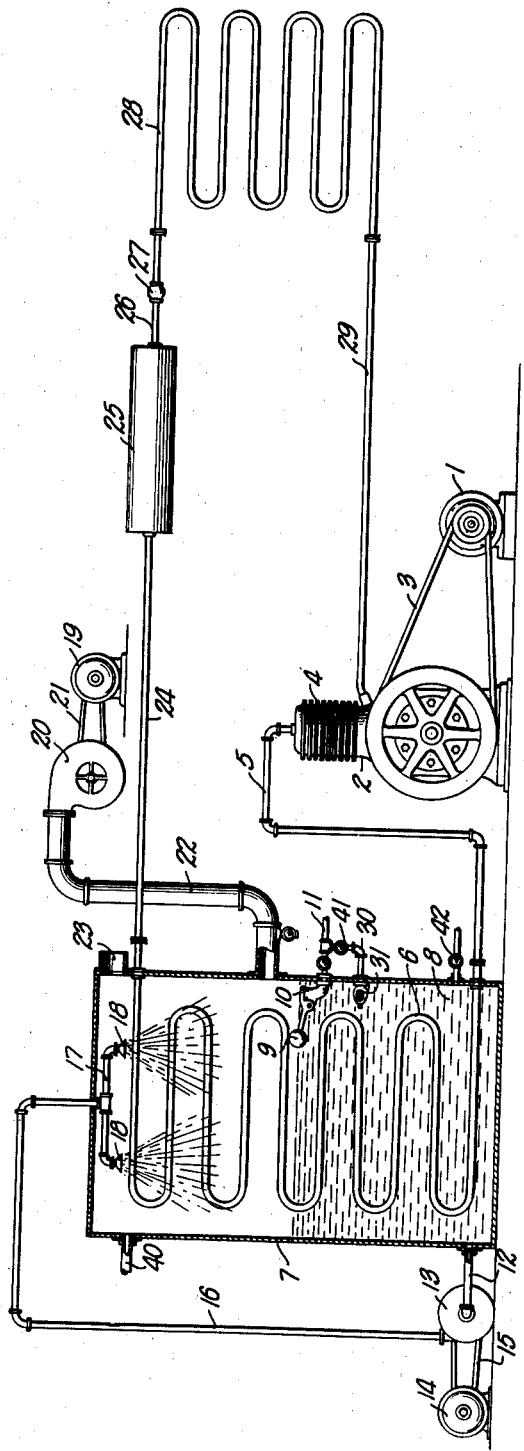
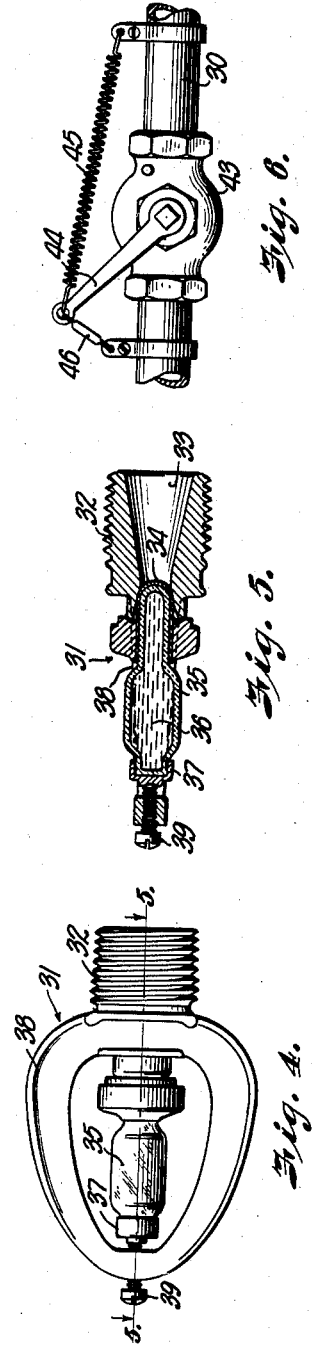
INVENTOR
John J. Strang
BY
ATTORNEY

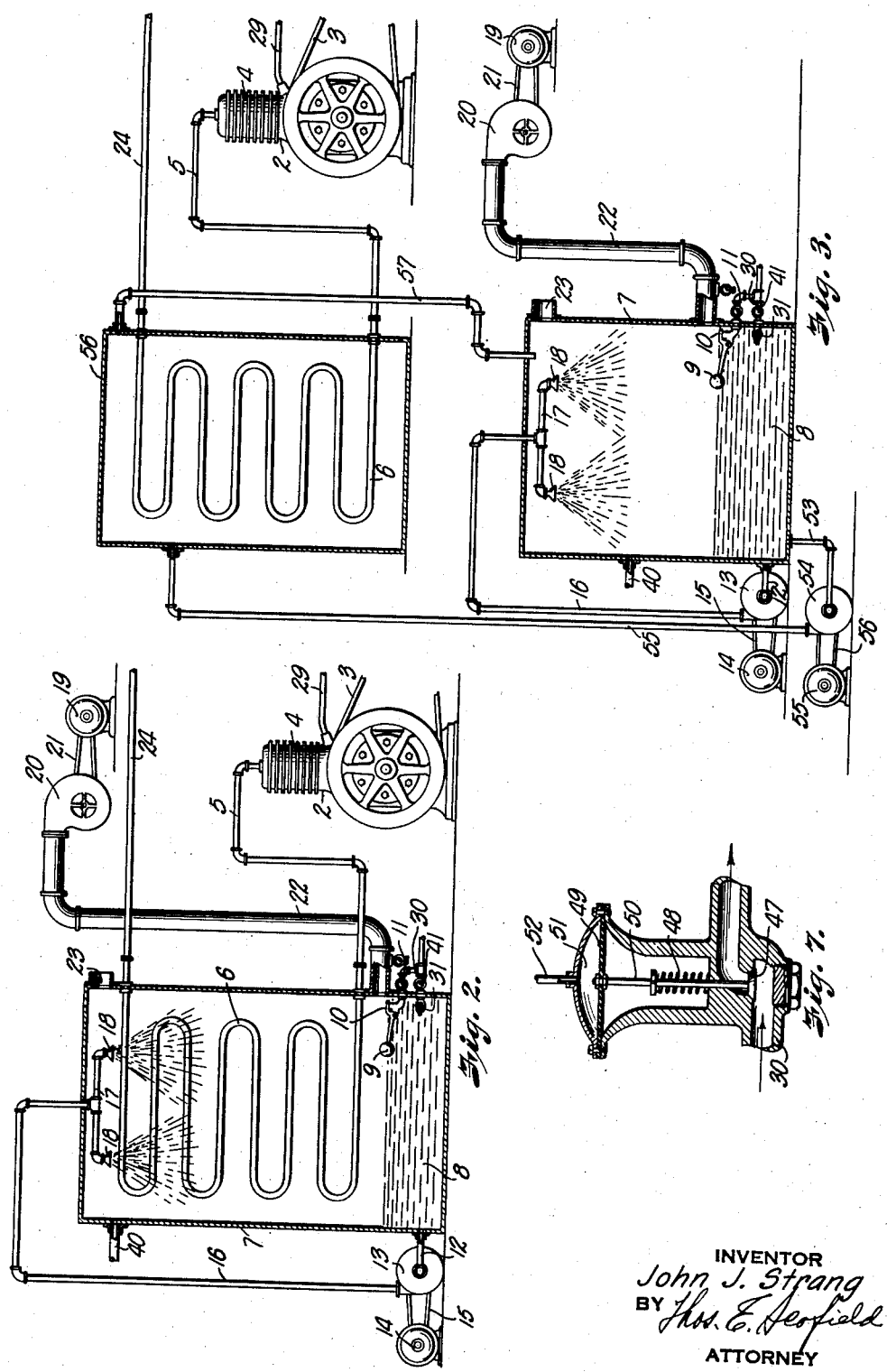

Patented Nov. 12, 1940

2,221,530

UNITED STATES PATENT OFFICE 2,221,530

REFRIGERATING SYSTEM

John J. Strang, Kansas City, Mo., assignor to Air Conditioning Equipment, Inc., Kansas City, Mo., a corporation of Missouri Application July 6, 1937, Serial No. 152,023

6 Claims. (Cl. 62—3)

My invention relates to refrigerating systems and more particularly to those refrigerating systems which comprise evaporative cooling means for the condenser.

In many refrigerating systems such as air conditioning units, refrigerating systems for ice boxes, cold storage plants, and the like, the heat is removed through a condenser by means of water which is in turn cooled by evaporation. The heat removed by the evaporation of the water reduces the quantity of water consumed and in cities where water must be paid for, a distinct saving is achieved. This saving has resulted in a resort to the cooling of condenser water by evaporation. The water is evaporated by spraying it by any suitable means in order to provide for an extended surface. Air is then blown in contact with the water in finely divided form to evaporate a portion of the water, thus cooling the body of the water. The condenser may be either wholly or partly submerged in the cool water, may be placed in the sprays so that the heat of the condenser may aid in the evaporation of a portion of the water, or the cooled water may be circulated around the condenser in heat exchange in a separate shell.

The cooling of the water requires the use of some means for spraying the water and some means for operating a blower for moving air in contact with the sprayed water. If the means for spraying the water should fail to function, or if the means for passing the air stream in contact with the sprayed water should become inoperative, the evaporative action is lost and the water will rapidly heat to such a point that the head pressure in the compressor will be such as to stall the compressor motor. When this occurs, the refrigeration action is lost.

In many cold storage rooms such as those associated with butcher shops and the like, if the refrigeration is lost, the food stuffs being preserved will become spoiled. This is especially true in small shops where, over week ends, and holidays, the shop is closed and no attendant is present.

One object of my invention is to provide, in combination with a refrigerating system having means to cool condenser water by evaporation, a means responsive to a predetermined temperature of the condenser water for providing a flow of city water from the city mains into the body of condenser water, so that condensing by heat exchange with city water will be automatically had when evaporative cooling of the condenser water fails.

Another object of my invention is to provide a safety device for refrigerating systems to automatically insure condensing by heat exchange with a source of water when the means for cooling the condenser water by evaporation becomes inoperative.

Other and further objects of my invention will appear from the following description.

In the accompanying drawings which form part of the instant specification and are to be read in conjunction therewith and in which like reference numerals are used to indicate like parts in the various views;

Figure 1 is a diagrammatic view with parts in section of a refrigerating system showing one mode of carrying out my invention.

Figure 2 is a diagrammatic view of the condensing system showing another form of means for evaporative cooling, equipped with one mode of carrying out my invention.

Figure 3 is a schematic view of a condensing means for a refrigerating system equipped with one mode of carrying out my invention.

Figure 4 is a side elevation of a detail showing one control element.

Figure 5 is a sectional view taken on the line 5—5 of Figure 4.

Figure 6 is an enlarged view of another form of control element adapted to be used in carrying out my invention.

Figure 7 is a sectional view of another form of control element adapted to be used in carrying out my invention.

In general, my invention contemplates the provision of temperature responsive means for controlling the admission of make-up water or continuous-flow water from the city mains or other suitable water source in event the evaporative cooling system fails to function.

More particularly, referring now to the drawings, a motor 1 drives a compressor 2 through any suitable means such as a belt 3. The compressed refrigerant leaves the compressor head 4 through pipe 5 and passes through condenser 6. Condenser 6 is disposed within a casing 7, the lower portion of which is filled with water 8, the lower portion of the condenser being immersed in the water. The water level is controlled by a float 9 which operates a valve 10 controlling the delivery of water from pipe 11 which is connected to the city mains or any other suitable water source. Water is pumped from the reservoir formed by the lower portion of the casing 7, through pipe 12, by pump 13 which may be of any suitable construction. The pump is driven by a motor 14 through a belt 15. The water leaves pump 13 through line 16 and is delivered to manifold 17 whence it is sprayed by spray heads 18 over a portion of the condenser 6. It is to be understood that any suitable means may be provided for spraying water.

A motor 19 drives a blower fan 20 through a belt 21. The blower is adapted to blow air through duct 22 into the upper portion of the casing 7 for contact with the water being sprayed therein. The air passing over the finely divided water will evaporate a portion of the same, removing the latent heat of vaporization, thus cooling the water. The action is aided by the heat exchange between the finely divided water and that portion of the condenser out of the water which is in contact with the spray. The moisture laden air leaves the casing through duct 23 and is passed to the atmosphere, carrying with it the heat removed. The float 9 permits water to enter the casing as it is evaporated and the structure is such that the evaporation is sufficient to remove the heat of compression of the compressed refrigerant fluid. The cooled refrigerant fluid leaves the condenser through pipe 24, passes into a reservoir 25, whence it leaves through line 26 and passes through expansion valve 27 into the refrigerating coil 28 which may be put to any desired use, as for example, the cooling of a cold storage compartment, the cooling of an air stream for air conditioning, or the cooling of drinking water. The refrigerant fluid leaves the refrigerating coil 28 through line 29 and passes to the compressor 4 for recompression and recycling.

A branch line 30 connects with the water supply line 11 and has its end projecting into the casing 7. The end of line 30 is closed by a plug provided with temperature expansive means for removing the plug, a valve adapted to be opened in response to temperature either of the condenser cooling water 8 or by a valve responsive to a predetermined pressure of the compressed refrigerant fluid. These devices are shown respectively in Figures 4, 5, 6, and 7, and are indicated generally by the reference numeral 31 in Figures 1, 2, and 3. Referring to Figures 4 and 5, the end of line 30 is closed by a screw threaded plug 32, which is provided with a bore 33 which is closed by a seal 34. The seal 34 is held in place by a glass vial 35 which is filled with a volatile liquid 36. The vial seats at its lower end in a seat 37. A frame 38 is formed with the plug 32 and carries a screw 39 adapted to urge the seat 37 against the vial 35 which, in turn, holds the seal 34 in place. The vial is disposed in the condenser water. Should the blower fan cease to function or should the pump 13 stop for any reason, the evaporative cooling action will be lost and the temperature of the condenser water will rise. When it rises to a predetermined point, as determined by the character of the liquid 36 and the thickness of the walls of the vial 35, the pressure generated within the vial by the expansion of the volatile liquid due to the temperature, will cause the vial to break. When this occurs, the pressure of the water through line 30 will cause the seal 34, which is normally held in place by the vial, to blow out and city water will flow into the casing 7, irrespective of the float 9. The city water will flow until the level of the water within the casing reaches the overflow pipe 40, which is connected to a drain. In this manner, water will constantly flow into the casing from the city mains and overflow through pipe 40. The constant supply of water will then cool the condenser by heat exchange. The air duct 22 is so constructed that it forms a standpipe to prevent water from flowing out through the blower casing. After the evaporative cooling parts which have failed to function have been repaired, valve 41 is closed and valve 42 is opened permitting the water to drain from the casing 7. The plug 32 is unscrewed and a new plug having a new glass vial is replaced, it being understood that valve 42 is closed as soon as the water level drops to the desired point. After the plug has been replaced, valve 41 is opened and the evaporative cooling system is again put into operation.

Referring to Figure 6, the pipe 30 terminates in a valve 43 having a valve operating lever 44 to which is connected a spring 45. The spring 45 urges the valve to open position. The fusible link 46 holds the valve in closed position against the action of spring 45. The link 46 is made of low melting alloy, the composition of which may be varied as is well known to the art depending upon the temperature limit desired.

Referring to Figure 7, the pipe 30 is closed by a valve 47 held in closed position by a spring 48. A flexible diaphragm 49 is secured to the valve stem 50. A chamber 51 is provided above the diaphragm 49. The chamber is connected by pipe 52 to the outlet of the compressor. If the evaporative cooling system fails to function, the pressure of the compressed refrigerant fluid will rise. When the pressure reaches a predetermined point, it will flex the diaphragm 49 against the action of spring 48 and move valve 47 to open position, permitting water to flow from the city mains.

Figure 2 represents a similar arrangement to that shown in Figure 1 but the level of the water 8 in the casing is lowered to such a point that the condenser 6 is out of the water 8 so that the cooling action is entirely by heat exchange of the water being sprayed over the condenser, evaporation of the water being depended upon to keep the condenser water at a low temperature.

In Figure 3, the condenser water 8 is cooled in casing 7 by the evaporative action of an air stream entering the casing from duct 22, upon the water being sprayed into the casing through spray heads 18. The cooled water leaves the casing 7 through line 53 and is pumped by pump 54, driven by motor 55 by belt 56. The water leaves the pump 54 through line 55 and passes into the housing 56 in which the condenser coil 6 is positioned. The cooling of the condenser 6 is by heat exchange with the water entering through line 55. The water leaves the casing 56 through line 57 and is returned to casing 7 where it is cooled by the evaporative action of the air stream entering the casing 7 through line 22.

It is believed the operation will be clear from the foregoing description. When the temperature of the water used to cool the condenser rises beyond a predetermined point, due to the failure of the evaporative condensing system, the rise in temperature operates means for supplying a constant stream of cool water from the city mains or other suitable source so that this cool water may be used as a heat exchange medium to cool the condenser until the evaporative cooling system for the condenser water can again be made operative.

It will be seen that I have accomplished the objects of my invention. I have provided a novel combination in connection with a refrigerating system enabling evaporative condensers to be used where it is important that refrigeration be maintained without the danger of losing refrigeration in the event the evaporative system failed to function.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a refrigerating system having a condenser coil, a reservoir adapted to contain cooling water, means for passing water from said reservoir in heat exchange with said condenser coil to remove heat therefrom, means for spraying water from said reservoir, means for passing an air stream in contact with said sprayed water to evaporate a portion thereof to cool the same, a water supply pipe for passing water into said reservoir, a valve in said pipe for preventing flow of water therethrough into said reservoir, and means operative upon failure of said means for passing an air stream or said means for spraying water for opening said valve.

2. In a refrigerating system having a condenser coil, a reservoir adapted to contain cooling water, means for passing water from said reservoir in heat exchange with said condenser coil to remove heat therefrom, means for spraying water from said reservoir, means for passing an air stream in contact with said sprayed water to evaporate a portion thereof to cool the same, a water supply pipe for passing water into said reservoir, a valve in said pipe for preventing flow of water therethrough into said reservoir, and means responsive to a rise in temperature of the cooled compressed refrigerant fluid for opening said valve.

3. In a refrigerating system having a condenser coil, a reservoir adapted to contain cooling water, means for passing water from said reservoir in heat exchange with said condenser coil to remove heat therefrom, means for spraying water from said reservoir, means for passing an air stream in contact with said sprayed water to evaporate a portion thereof to cool the same, a water supply pipe for passing water into said reservoir, a valve for controlling said pipe, means responsive to the level of the water in the reservoir for controlling said valve, a second pipe for passing water into said reservoir, a valve closing said second pipe, and means responsive to a predetermined temperature of water in said reservoir for opening said valve.

4. In a mechanical refrigerating system having a condenser coil, a housing adapted to contain cooling water, said condenser coil being disposed within said housing, means for spraying the cooling water in said housing, means for passing an air stream through said housing in contact with said sprayed water to evaporate a portion thereof to cool the same, a water supply pipe passing into said housing, a float controlled valve for said water supply pipe, a second water supply pipe passing into said housing, a plug for said second water supply pipe, and means responsive to the temperature of the water in said housing for removing said plug.

5. In a mechanical refrigerating system having a condenser coil, a housing adapted to contain cooling water, said condenser coil being disposed within said housing, means for spraying cooling water in said housing, means for passing an air stream through said housing in contact with said sprayed water to evaporate a portion thereof to cool the same, a water supply pipe passing into said housing, a valve for said water supply pipe, means responsive to an increase in temperature of the cooled compressed refrigerant fluid for opening said valve, whereby water will flow into said housing, an overflow pipe for said housing, whereby said condenser coil will be cooled by heat exchange with flowing water when the temperature of the compressed refrigerant fluid being cooled by evaporation reaches a predetermined point.

6. In a mechanical refrigerating system having a condenser coil, a housing adapted to contain cooling water, said condenser coil being disposed within said housing, means for spraying cooling water in said housing, means for passing an air stream through said housing in contact with the sprayed water to evaporate a portion thereof to cool the same, a water supply pipe passing into said housing, a float controlled valve for said water supply pipe, a second supply pipe passing into said housing, a valve for controlling said second water supply pipe, thermostatic means for opening said last named valve whereby when said means for cooling the water in said housing becomes inoperative said valve will be opened to supply water to said housing, and an overflow pipe communicating with said housing for removing water admitted through said second pipe.

JOHN J. STRANG.